(12) United States Patent  
Johnsen et al.

(10) Patent No.: US 8,579,101 B2  
(45) Date of Patent: Nov. 12, 2013

(54) BAG TURNING MACHINE AND METHOD

(75) Inventors: Ole Johnsen, Burlington (CA); Denis Trottier, Mississauga (CA); Wojciech Kowalczuk, Ancaster (CA)

(73) Assignee: Johnsen Machine Company Ltd. (CA)

( * ) Notice: Subject to any disclaimer, the term of this patent is extended or adjusted under 35 U.S.C. 154(b) by 419 days.

(21) Appl. No.: 12/977,873

(22) Filed: Dec. 23, 2010

(65) Prior Publication Data

US 2012/0163951 A1 Jun. 28, 2012

(51) Int. Cl.
*B65G 47/24* (2006.01)

(52) U.S. Cl.
USPC ............ 198/406; 414/764; 414/765; 414/767

(58) Field of Classification Search
USPC ......... 198/403, 404, 406, 407, 409, 410, 617; 414/757, 758, 759, 760, 764, 765, 767, 414/769
See application file for complete search history.

(56) References Cited

U.S. PATENT DOCUMENTS

| | | | | |
|---|---|---|---|---|
| 1,253,748 A * | 1/1918 | Tyson | ........................... | 414/568 |
| 4,356,906 A * | 11/1982 | Fallas | ........................... | 198/413 |
| 4,398,383 A * | 8/1983 | Prakken | ........................ | 53/537 |
| 4,471,865 A * | 9/1984 | Johnson | ........................ | 198/408 |
| 4,573,863 A * | 3/1986 | Picotte | ........................ | 414/763 |
| 4,718,534 A * | 1/1988 | Harper | ........................... | 198/401 |
| 4,774,799 A * | 10/1988 | Durant | ........................... | 53/535 |
| 4,883,162 A * | 11/1989 | Flot | ................................ | 198/374 |
| 5,006,037 A * | 4/1991 | Bluemle | ........................ | 414/771 |
| 5,012,915 A * | 5/1991 | Kristola et al. | ............... | 198/411 |
| 5,046,912 A * | 9/1991 | Bostrom et al. | .............. | 414/358 |
| 5,477,607 A * | 12/1995 | Ohta et al. | ........................ | 29/748 |
| 5,615,762 A * | 4/1997 | Dyess | ......................... | 198/464.1 |
| 5,979,634 A * | 11/1999 | Odegard et al. | ............... | 198/408 |
| 6,164,900 A * | 12/2000 | Labell et al. | ................. | 414/792.1 |
| 6,398,008 B1 * | 6/2002 | Suga | ............................ | 198/404 |
| 6,557,692 B2 * | 5/2003 | Runonen | ....................... | 198/403 |
| 6,648,123 B1 * | 11/2003 | Rustad | .......................... | 198/400 |
| 6,793,454 B2 * | 9/2004 | Brizzi | ............................ | 414/767 |
| 7,475,768 B2 * | 1/2009 | Takaoka et al. | ................. | 198/412 |
| 7,607,882 B2 * | 10/2009 | Matalevich et al. | .......... | 414/789 |
| 7,695,240 B2 * | 4/2010 | Ghosh et al. | .................. | 414/802 |
| 7,744,337 B2 * | 6/2010 | Kaufmann et al. | ........ | 414/796.9 |
| 8,151,971 B2 * | 4/2012 | Baldanza et al. | .......... | 198/418.5 |
| 8,226,345 B2 * | 7/2012 | De Leo | ....................... | 414/790.3 |

* cited by examiner

*Primary Examiner* — Douglas Hess
(74) *Attorney, Agent, or Firm* — Steven M. Greenberg, Esq.; Carey Rodriguez Greenberg O'Keefe, LLP

(57) ABSTRACT

A bag turning machine comprises a frame, a shaft rotatably carried by the frame, a plurality of bag turning members carried by the shaft for receiving and turning a filled and sealed bag, and a brake. The brake resists rotation of the shaft upon receipt by the bag turning members of a filled and sealed bag and, following release by the bag turning members of the bag, arrests rotation of the shaft in a predetermined position for the bag turning members to receive another filled and sealed bag. Each bag is received in an upright position and moving substantially parallel to its width, which is less than its height and greater than its depth, and tipped over onto the bag turning members so that the bag lands on a side edge thereof. Rotating the bag turning members turns the bag to rest on its face while lowering the bag.

12 Claims, 19 Drawing Sheets

BAG TURNING MACHINE AND METHOD

FIELD OF INVENTION

The present invention relates to machines for use in packaging operations, and more particularly to machines for receiving filled and sealed bags in a first orientation and placing them into a second orientation.

BACKGROUND OF THE INVENTION

In packaging operations in which bags are filled with a product and then sealed, the filled and sealed bags will often emerge from the sealing equipment, or from combined filling and sealing equipment, in a vertically upright orientation, with each bag resting on the base of the bag with the seal at the top. For transport and packaging, however, it may be advantageous to place the bags in a horizontal orientation, with each bag resting on its face with the base at one end and the seal at the other. Accordingly, a mechanized solution for turning the bags from the upright orientation into the horizontal orientation would be desirable.

SUMMARY OF THE INVENTION

The present invention is a bag turning machine which turns filled and sealed bags from an upright position resting on the base of the bag to a position in which the bag rests on its face, while lowering the filled and sealed bag.

In one aspect, the present invention is directed to a bag turning machine, comprising a frame, a shaft rotatably carried by the frame, a plurality of bag turning members carried by the shaft for receiving a filled and sealed bag resting on its side edge and turning the filled and sealed bag onto its face, and a brake. The brake resists rotation of the shaft upon receipt by the bag turning members of the filled and sealed bag and arrests rotation of the shaft, following release by the bag turning members of the filled and sealed bag, in a predetermined position for receipt by the bag turning members of another filled and sealed bag.

In one embodiment, the brake comprises a cam rotatably carried by the frame and drivingly coupled to the shaft so that resistance to rotation of the cam resists rotation of the shaft, a cam follower movably carried by the frame and arranged to follow an outer perimeter of the cam, and a biasing member acting between the frame and the cam follower to urge the cam follower inwardly against the outer perimeter of the cam. The outer perimeter of the cam has alternating resistance increasing portions and arresting portions. In a particular embodiment, the cam is a cloverleaf cam whose leaves define the resistance increasing portions and whose recesses between the leaves define the arresting portions.

Preferably, the biasing member is adjustable to vary the biasing force exerted by the biasing member on the cam follower. In one embodiment, the biasing member is a pneumatic piston-cylinder assembly; in another embodiment, the biasing member is a spring.

In one embodiment, the bag turning machine further comprises a transport surface below and laterally offset from the shaft for receiving the filled and sealed bags from the bag turning members. The transport surface may comprise a conveyor belt.

In one embodiment, the shaft is inclined upwardly relative to horizontal to receive the filled and sealed bags such that a bottom of each filled and sealed bag is lower than a sealed top thereof. The transport surface may also be inclined upwardly relative to horizontal to receive the filled and sealed bags from the bag turning members such that a bottom of each filled and sealed bag is lower than a sealed top thereof.

In one embodiment, the bag turning machine further comprises a guide carried by the frame and positioned opposite the shaft to direct the filled and sealed bags onto the transport surface.

In one embodiment, the bag turning machine further comprises a tipping member carried by the frame and positioned higher than the shaft and in alignment therewith to tip the filled and sealed bags from an upright position so that each filled and sealed bag lands on its side edge when received by the bag turning members.

The bag turning members may comprise sets of paired projections arranged in a substantially L-shaped configuration and extending perpendicularly from an axis of rotation of the shaft. In one embodiment, the sets of paired projections comprise plates extending along the shaft. In a particular embodiment, the shaft comprises a square tube and the plates extend from each face of the tube so that each set of paired projections is a pair of plates extending from adjacent faces of the tube and each pair of plates shares a common plate with each adjacent pair of plates. In another embodiment, the sets of paired projections comprise spaced-apart fingers extending along the shaft.

In another aspect, the present invention is directed to a bag turning machine comprising a frame, a shaft rotatably carried by the frame, a plurality of generally L-shaped sets of bag turning members extending from the shaft perpendicularly to an axis of rotation of the shaft and spaced about a perimeter of the shaft, a cloverleaf cam rotatably carried by the frame, a cam follower movably carried by the frame and arranged to follow an outer perimeter of the cam, and a biasing member acting between the frame and the cam to urge the cam follower inwardly against the outer perimeter of the cam. The cam has a number of leaves equal to the number of sets of bag turning members extending from the shaft and is drivingly coupled to the shaft so that resistance to rotation of the cam resists rotation of the shaft. Resistance from the biasing member applied to the shaft through the cam follower and the cam maintains a given set of bag turning members in a predetermined orientation to receive a filled and sealed bag, and a filled and sealed bag tipped over from an upright position and received by one of the sets of bag turning members with the bag resting on a side edge thereof rotates the shaft against and overcomes resistance from the biasing member so that the bag is lowered and turned by the bag turning members to rest on a face of the bag. The resistance from the biasing member controls the speed at which the bag is turned and lowered.

Preferably, the biasing member is adjustable to vary the resistance therefrom. The biasing member may be a pneumatic piston-cylinder assembly.

In a further aspect, the present invention is directed to a machine-implemented method of turning a bag. The method comprises receiving a filled and sealed bag in an upright position, with the bag having a width less than its height and a depth less than its width and moving substantially parallel to its width, tipping the bag over onto bag turning members of a bag turning machine so that the bag lands on a side edge thereof, and rotating the bag turning members to turn the bag to rest on a face of the bag while lowering the bag from a first height to a second height.

BRIEF DESCRIPTION OF THE DRAWINGS

These and other features of the invention will become more apparent from the following description in which reference is made to the appended drawings wherein.

DETAILED DESCRIPTION

Figure 1:
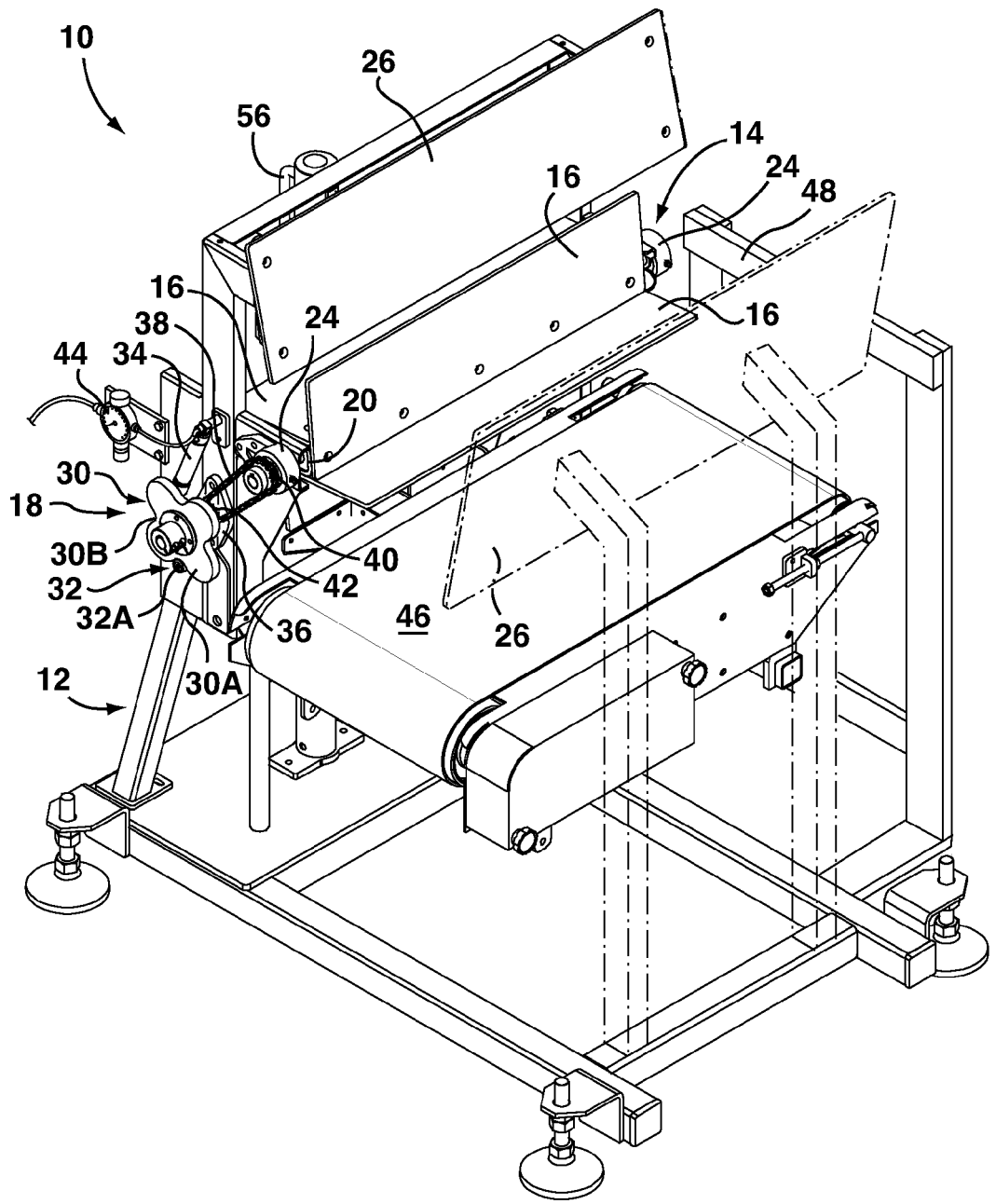
FIG. 1 is a front perspective view of a first exemplary embodiment of a bag turning machine, according to an aspect of the present invention.
Figure 2:
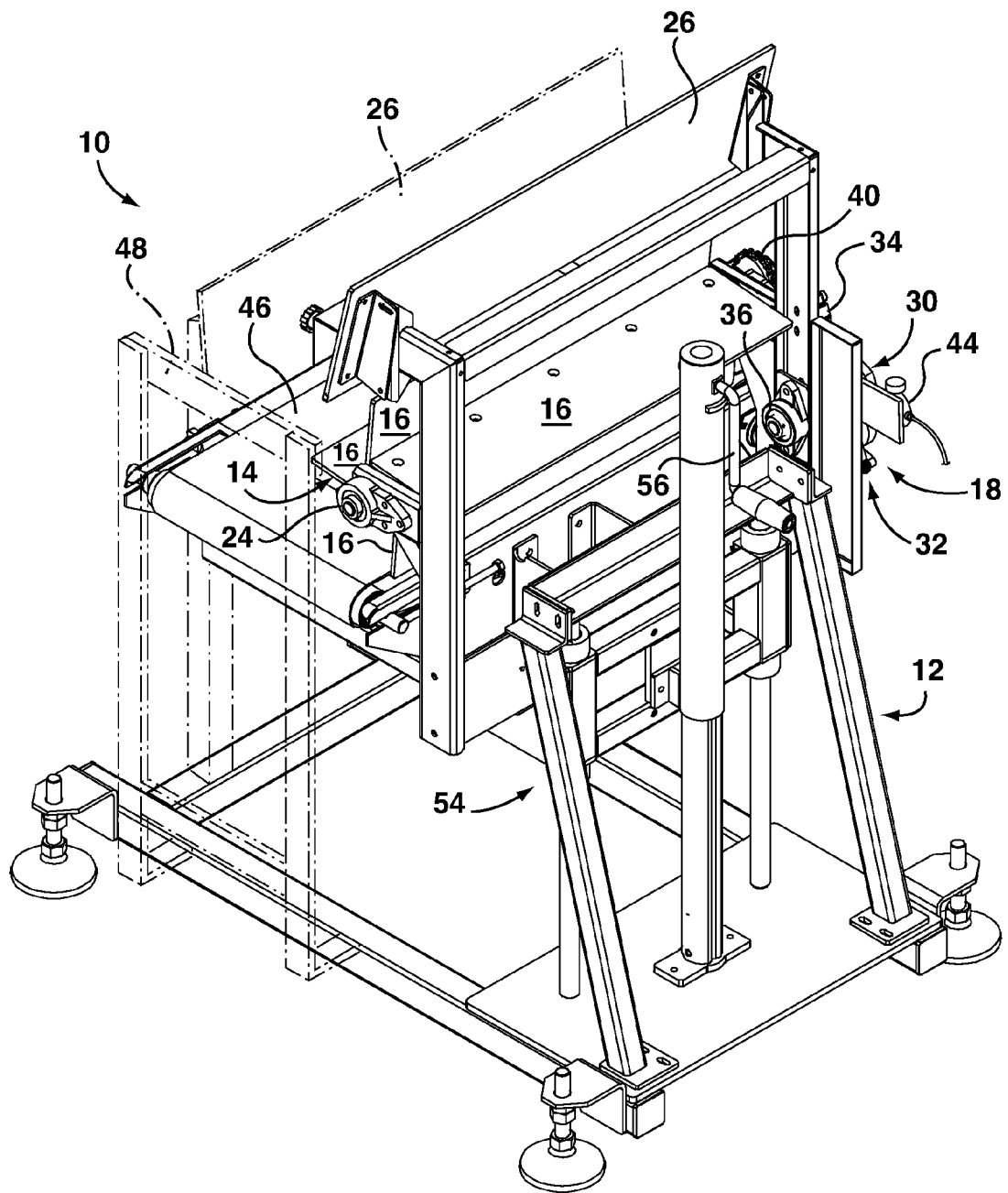
FIG. 2 is a rear perspective view of the bag turning machine of FIG. 1.
Figure 3:
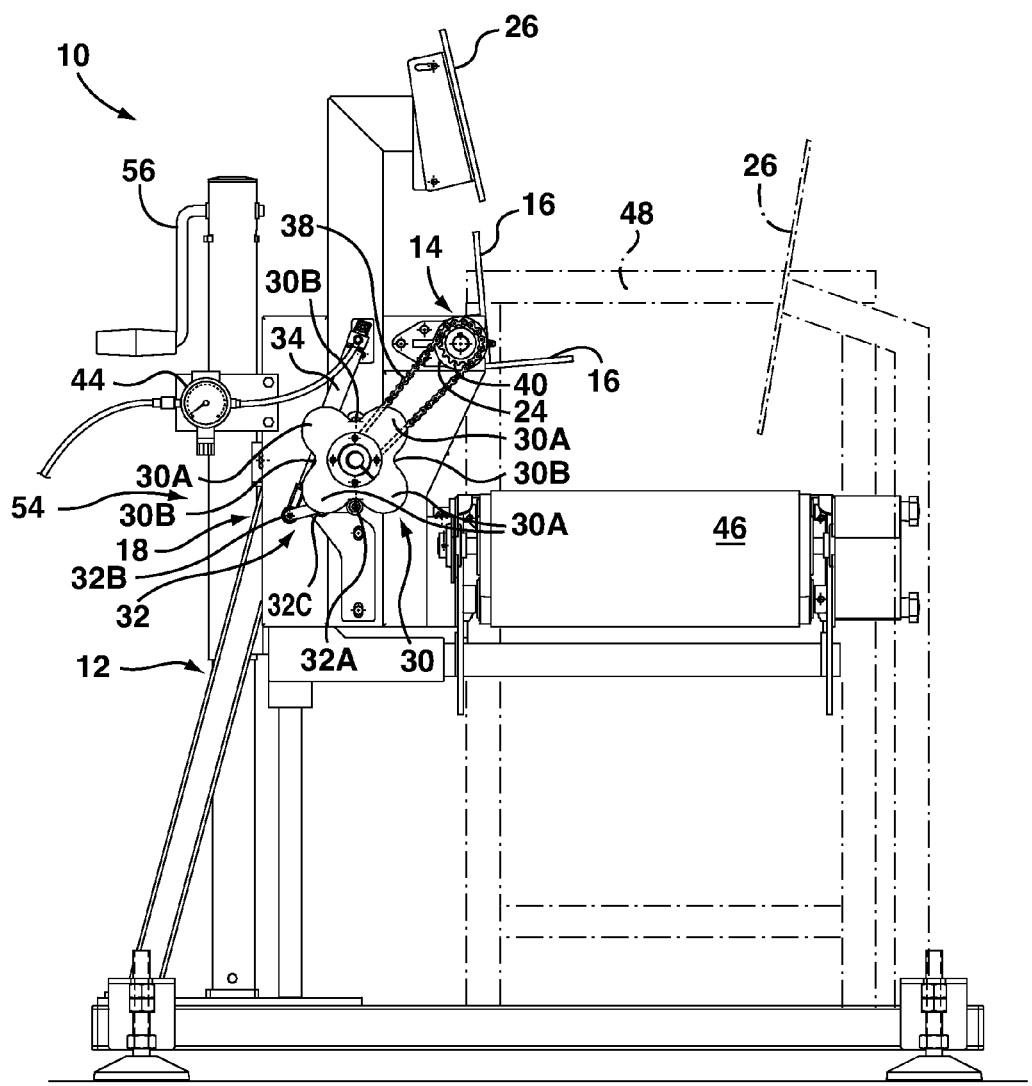
FIG. 3 is a front view of the bag turning machine of FIG. 1.
Figure 4:
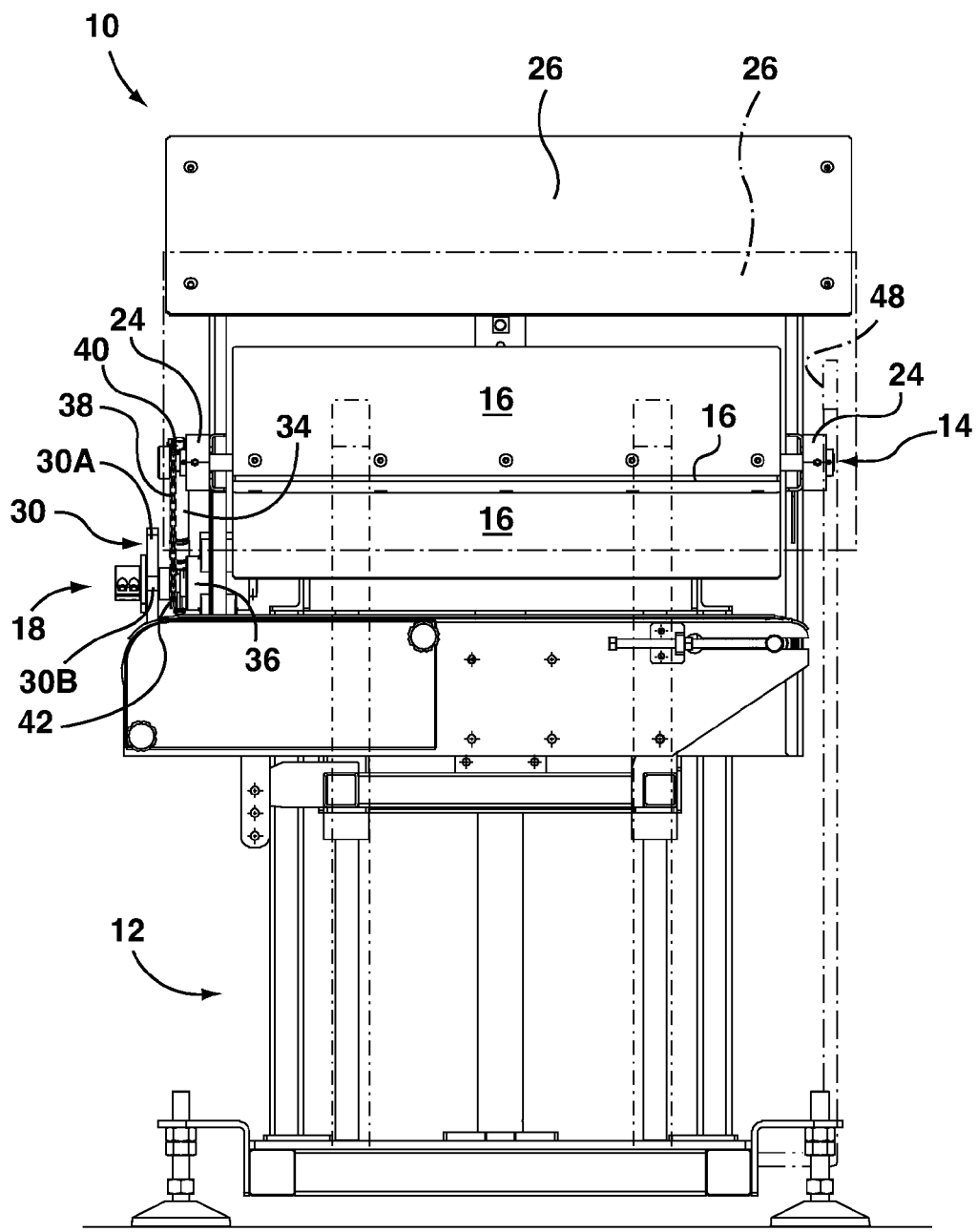
FIG. 4 is a first side view of the bag turning machine of FIG. 1.
Figure 5:
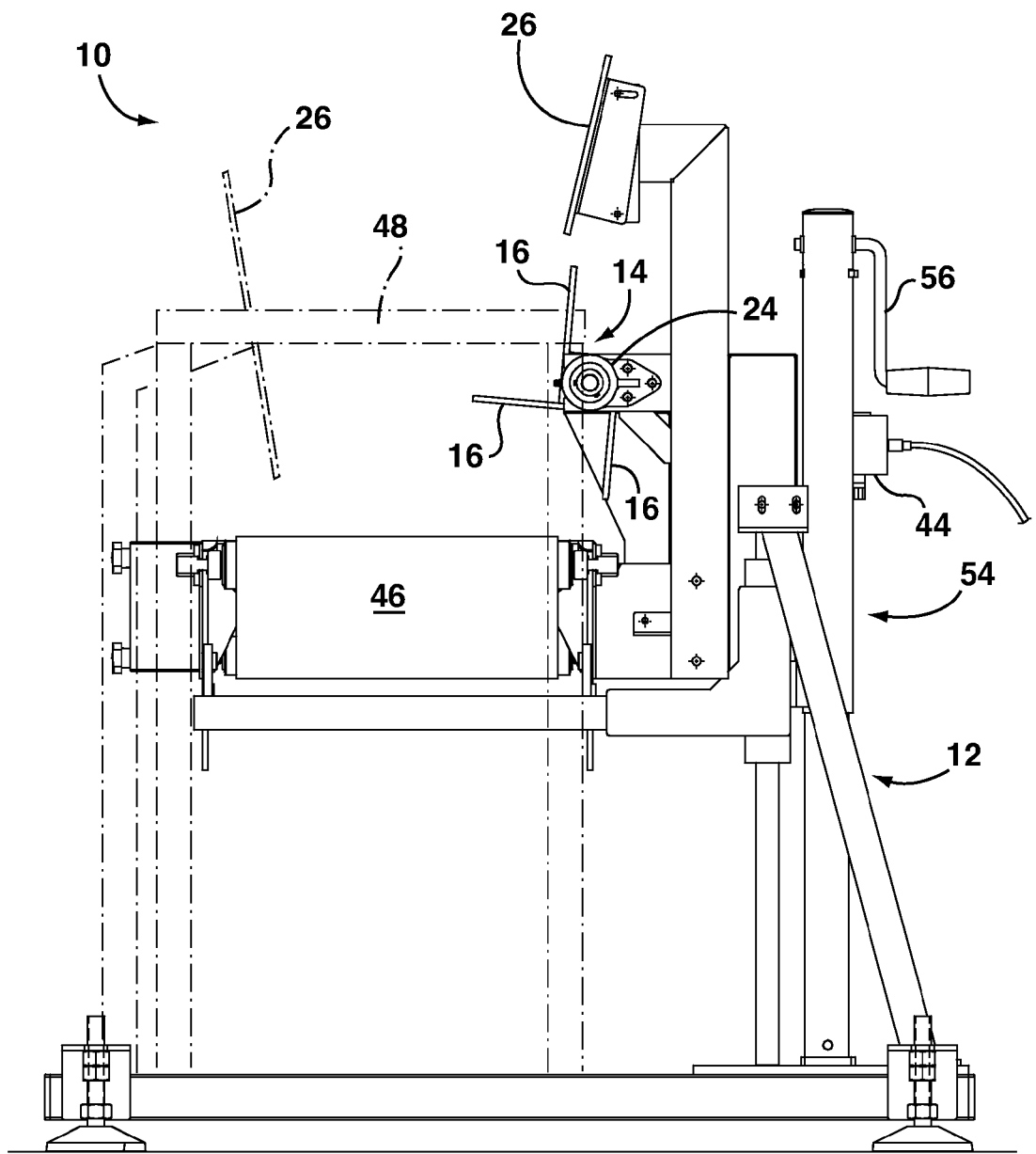
FIG. 5 is a rear view of the bag turning machine of FIG. 1.

With reference now to FIGS. 1 to 7, and with particular emphasis on FIGS. 1 and 3, an exemplary bag turning machine according to an aspect of the present invention is shown generally at 10. The bag turning machine 10 comprises a frame 12, a shaft 14 rotatably carried by the frame 12, a plurality of bag turning members 16 carried by the shaft 14, and a brake 18. As will be explained in greater detail below, the bag turning members 16 receive a filled and sealed bag resting on its side edge and turn the filled and sealed bag onto its face, and the brake 18 resists and thereby slows rotation of the shaft 14 upon receipt by the bag turning members 16 of the filled and sealed bag and, following release by the bag turning members 16 of the filled and sealed bag, arrests rotation of the shaft 14 in a predetermined position for receipt by the bag turning members 16 of another filled and sealed bag.

Figure 1A:
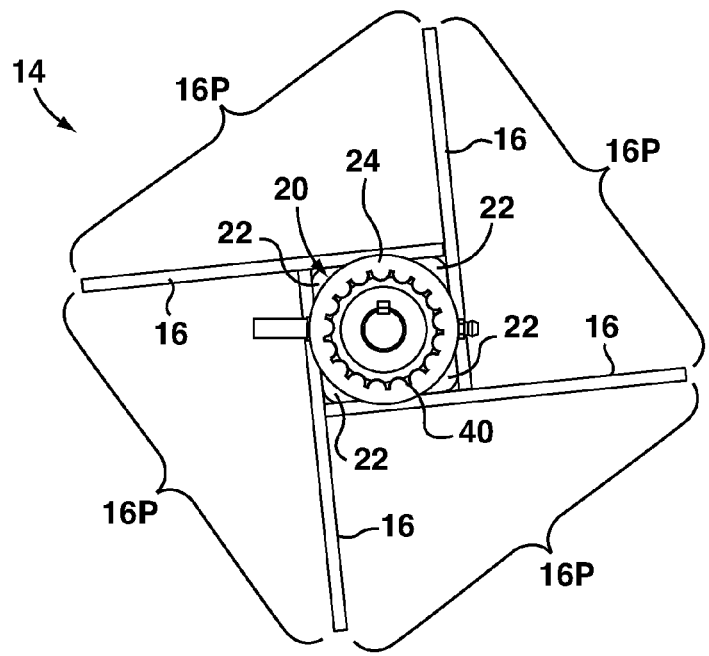
FIG. 1A is an end view of a shaft and bag turning members of the bag turning machine of FIG. 1.
Figure 1B:
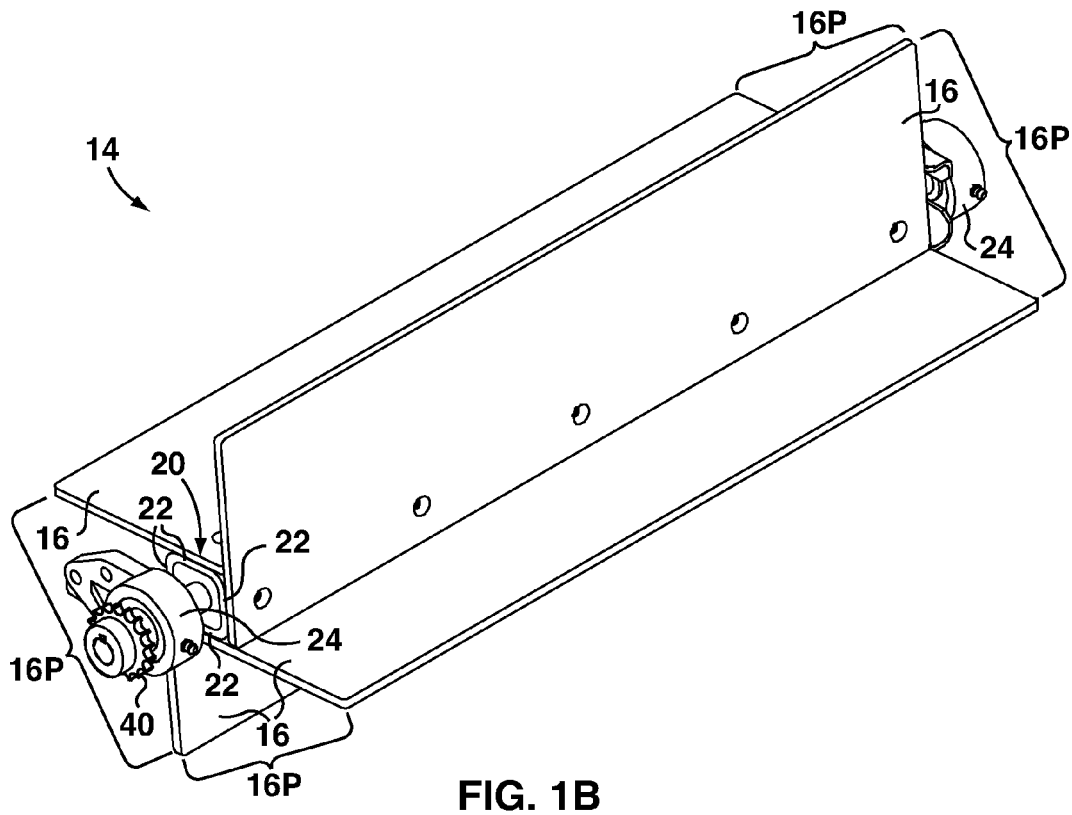
FIG. 1B is a perspective view of the shaft and bag turning members of FIG. 1A.

Referring now to FIGS. 1A and 1B, in the illustrated embodiment the shaft 14 comprises a square tube 20 having four faces 22 and the bag turning members 16 comprise sets of paired projections arranged in a substantially L-shaped configuration and extending perpendicularly from an axis of rotation of the shaft 14. More particularly, the bag turning members 16 comprise plates 16 extending along the length of the shaft 14. The plates 16 are spaced about the perimeter of the shaft 14 and arranged into pairs 16P. One plate 16 extends from each face 22 of the tube 20. The plates 16 in each pair 16P of plates 16 extend from adjacent faces 22 of the tube 20 and each pair 16P of plates 16 shares a common plate 16 with each adjacent pair of plates 16, so that there are four plates 16 and four pairs of plates 16. The shaft 14 is rotatably supported by bearings 24.

Figure 1C:
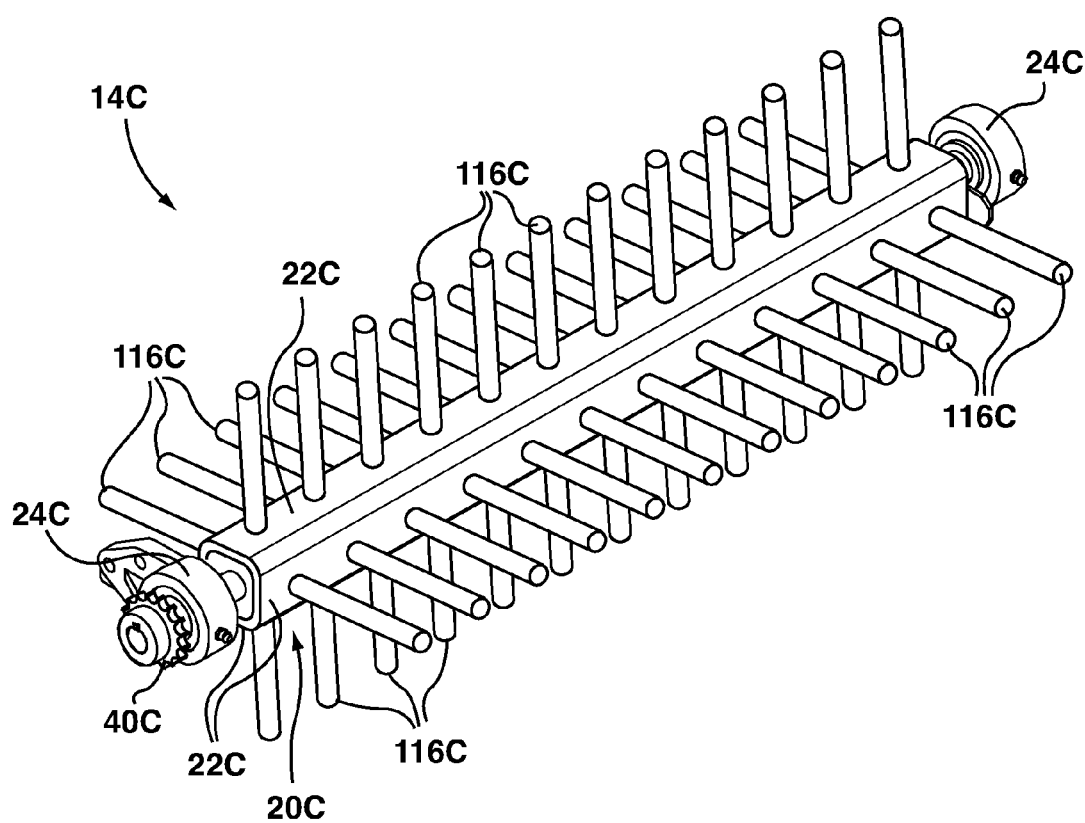
FIG. 1C is a perspective view of an alternate embodiment of a shaft and bag turning members.

An alternate embodiment of a shaft is shown in FIG. 1C and indicated by the reference numeral 14C. In the alternate shaft embodiment 14C the sets of paired projections arranged in a substantially L-shaped configuration comprise spaced-apart fingers 116C projecting from and extending along the shaft 14C. The reference numerals for the alternate shaft embodiment 14C corresponding to features of the first embodiment of the shaft 14 are identical to those for the first embodiment of the shaft 14, except with the suffix "C".

Figure 11:
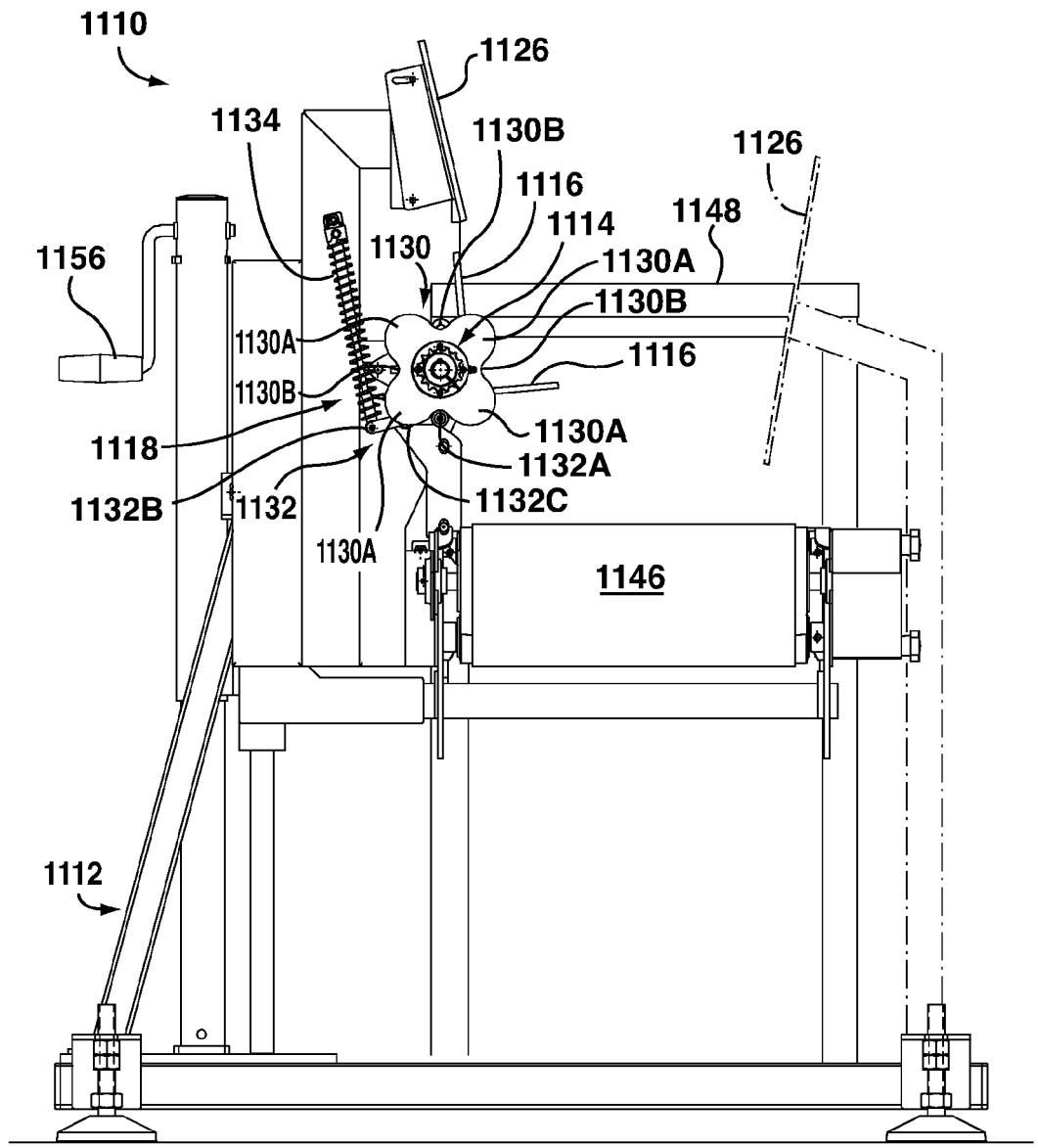
FIG. 11 is a front view of a second embodiment of a bag turning machine according to an aspect of the present invention.

Referring once again to FIGS. 1 to 7, again with emphasis on FIGS. 1 and 3, the brake 18 comprises a cam 30, a cam follower 32 and a biasing member 34. The cam 30 is rotatably carried by the frame 12 in a bearing 36, and is drivingly coupled to the shaft 14, in particular by a chain 38 encircling a first sprocket 40 on the shaft 14 and a second sprocket 42 on the cam 30 (see FIGS. 4 and 6) so that resistance to rotation of the cam 30 resists rotation of the shaft 14. The illustrated sprocket and chain arrangement is merely one exemplary method for drivingly coupling the cam 30 to the shaft 14, and other arrangements, such as intermeshing gears, may also be used. In addition, in an alternate embodiment, as shown in FIG. 11, the cam 30 may be drivingly coupled to the shaft 14 by being directly mounted on the shaft 14, thereby omitting the chain 38 and sprockets 40, 42. The outer perimeter of the cam 30 has alternating resistance increasing portions 30A and arresting portions 30B. The cam follower 32 is movably carried by the frame and arranged to follow the outer perimeter of the cam 30, and the biasing member 34 acts between the frame 12 and the cam follower 32 to urge the cam follower 32 against the outer perimeter of the cam 30. In the illustrated embodiment, the cam follower 32 is pivotingly mounted to the frame 12. The first end 32A of the cam follower 32 engages and follows the outer perimeter of the cam 30, and the second end 32B of the cam follower 30 is pivotally coupled to the biasing member 34, with the pivot point 32C at which the cam follower 32 is mounted to the frame 12 disposed between the first end 32A and second end 32B of the cam follower 32.

In the particular exemplary embodiment shown in FIGS. 1 to 7, the cam 30 is a cloverleaf cam 30. The leaves 30A of the cloverleaf cam 30 define the resistance increasing portions 30A, and the recesses 30B between the leaves 30A define the arresting portions 30B. The cam 30 has a number of leaves 30A equal to the number of sets of bag turning members, that is, the number of pairs of plates 16, in this case four. When the shaft 14 is in position for the bag turning members 16 to receive a filled and sealed bag, the first end 32A of the cam follower 32 rests in one of the recesses 30B between the leaves 30A of the cam 30, as shown in FIGS. 1 to 7, and the cam 30, and hence the shaft 14, are maintained in position by the biasing member 34.

In the illustrated embodiment, the biasing member 34 is a pneumatic piston-cylinder assembly 34, which can be adjusted to vary the biasing force exerted on the cam follower 32. The pneumatic piston-cylinder assembly 34 is connected to a source of compressed air (not shown) through an adjustable valve 44 which enables the pressure inside the pneumatic piston-cylinder assembly 34, and hence the biasing force exerted on the cam follower 32, to be varied to accommodate filled and sealed bags of differing mass, as described in greater detail below.

In alternative embodiments, as shown in FIG. 11, a spring 1134 may be used as the biasing member, and may be provided with a suitable adjustment mechanism for varying the resistance provided by the spring 1134.

Continuing to refer to FIGS. 1 to 7 and in particular to FIGS. 1 and 3, the bag turning machine 10 further comprises a conveyor belt 46 positioned below and laterally offset from the shaft 14 for receiving filled and sealed bags from the bag turning members 16. The conveyor belt 46 serves as a transport surface for moving the filled and sealed bags away from the position in which they are placed by the bag turning members 16 so that bags are not placed on top of one another. In an alternate embodiment, the transport surface may simply be a smooth, low friction surface. In such an embodiment, the low friction surface may be inclined upwardly relative to horizontal so that the filled and sealed bags slide under gravity toward a desired location once placed by the bag turning members 16, or a separate mechanism may be used to slide the filled and sealed bags along the surface.

A tipping member 48, such as a rod or bar, is preferably positioned higher than the shaft and in alignment therewith to tip the filled and sealed bags from an upright position so that each filled and sealed bag lands on its side edge when received by the bag turning members 16. The tipping member 48 may be carried by the frame 12 so as to form part of the bag turning machine 10, as shown in FIGS. 1 to 7, or may be a separate element carried, for example, by a conveyor system feeding the bag turning machine 10, as shown in FIGS. 8A to 10D. Guides 26 are preferably positioned above and opposite the shaft 14 to assist in directing the filled and sealed bags onto the plates 16 and then onto the conveyor belt 46 (or other transport surface), and similarly may be carried by the frame 12 or may be separate elements carried, for example, by a conveyor system feeding the bag turning machine 10. In several of the drawings, one of the guides 26 is shown in phantom with dashed lines so as not to obscure other features.

Figure 6:
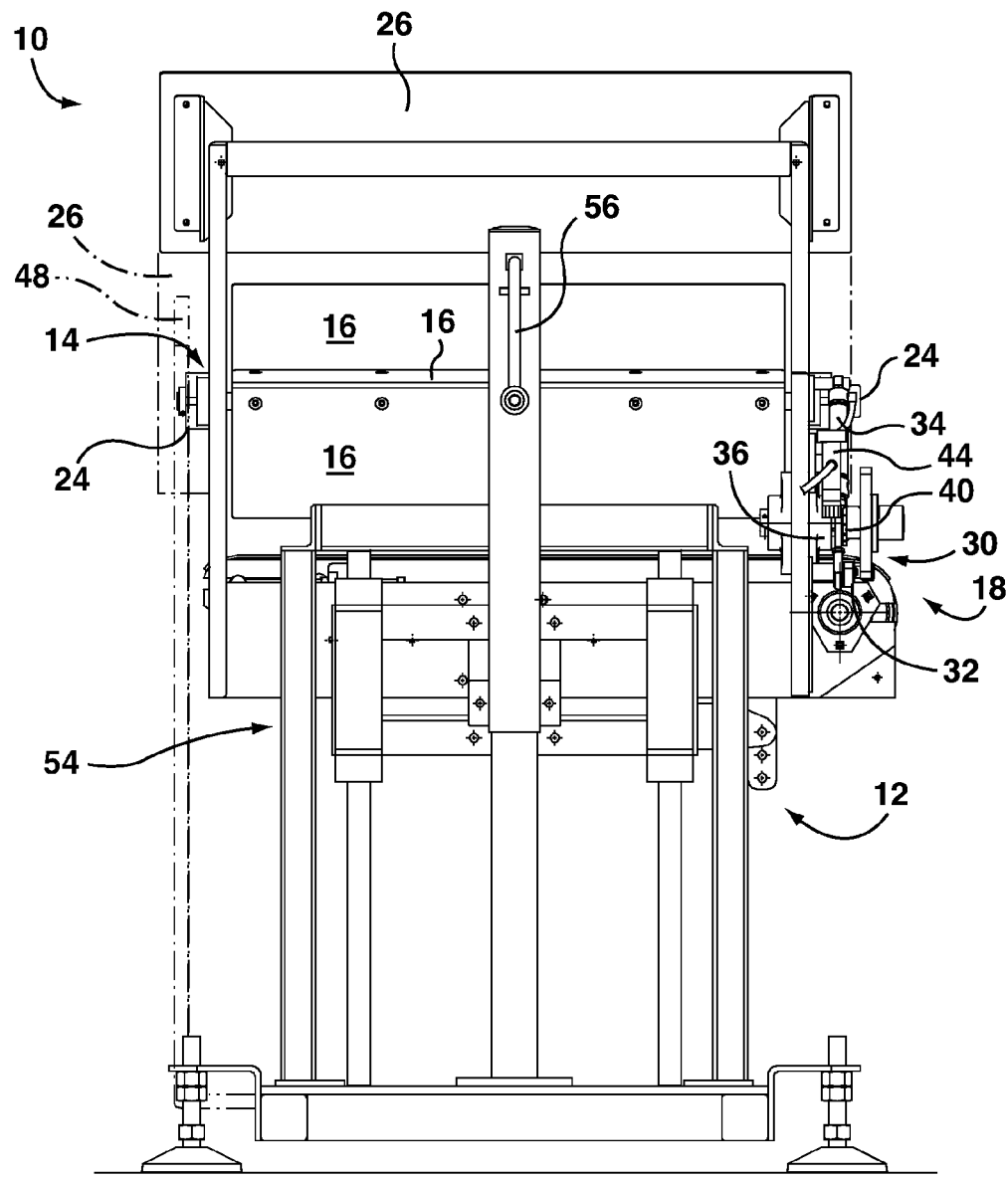
FIG. 6 is a second side view of the bag turning machine of FIG. 1.
Figure 7:
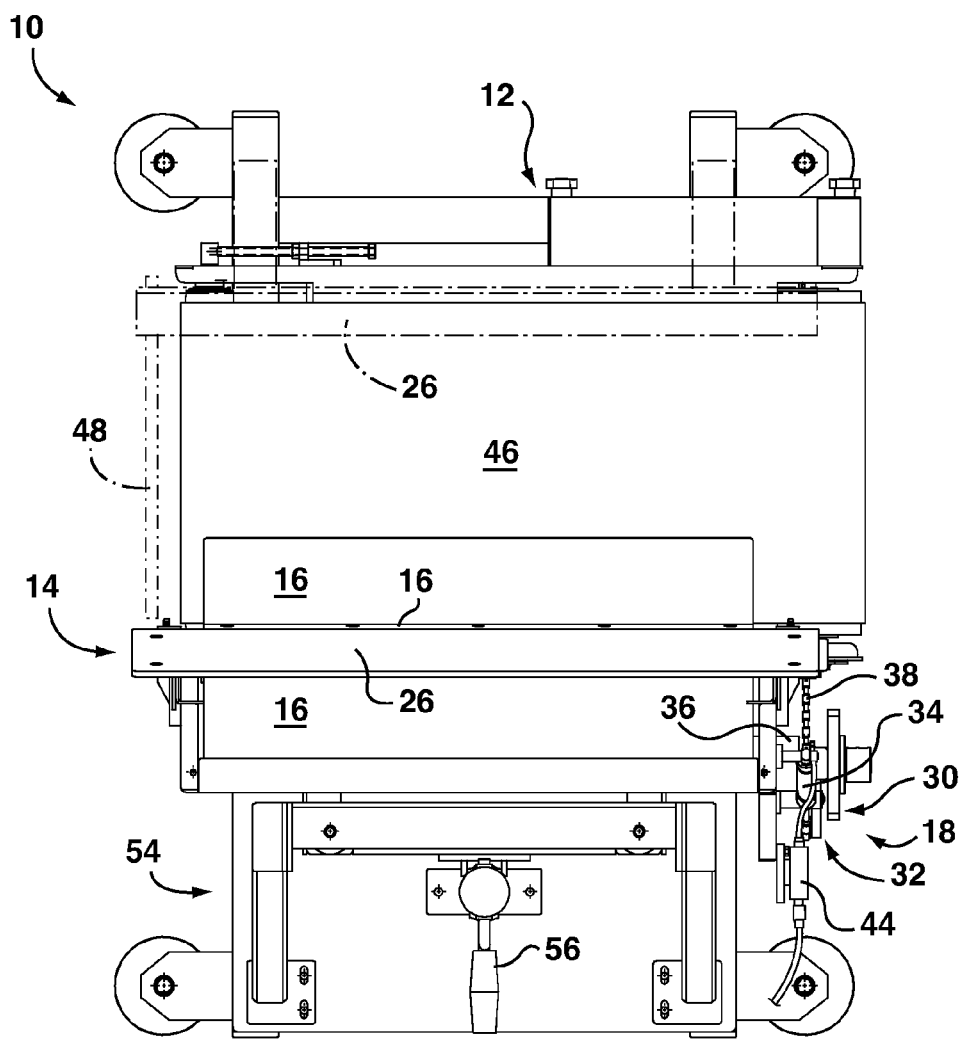
FIG. 7 is a plan view of the bag turning machine of FIG. 1.

As best seen in FIGS. 2 and 6, the portion of the frame 12 carrying the shaft 14, brake 18, biasing member 34 and conveyor belt 46 is coupled to the rest of the frame 12 by way of a height adjustment mechanism 54. The height of the portion of the frame 12 carrying the shaft 14, brake 18, biasing member 34 and conveyor belt 46 may be adjusted by way of a handle 56. Construction of the height adjustment mechanism is within the capability of one skilled in the art, now informed by the herein disclosure, and is not described further.

Use of a bag turning machine according to an aspect of the present invention will now be described, with reference to FIGS. 8A to 10D. Such bag turning machines may be used in association with bag filling and sealing machines which fill bags with a desired product. Typically, such machines fill bags through an opening in the top of the bag and then seal them, and therefore the filled and sealed bags often emerge from the bag filling machine in an upright position, resting on the base of the bag. The bags are typically sealed with heat sealing, although bag turning machines according to aspects of the present invention may also be used with bags sealed other than by heat sealing, such as by adhesive or a strip-tie or twist-tie.

Figure 9:
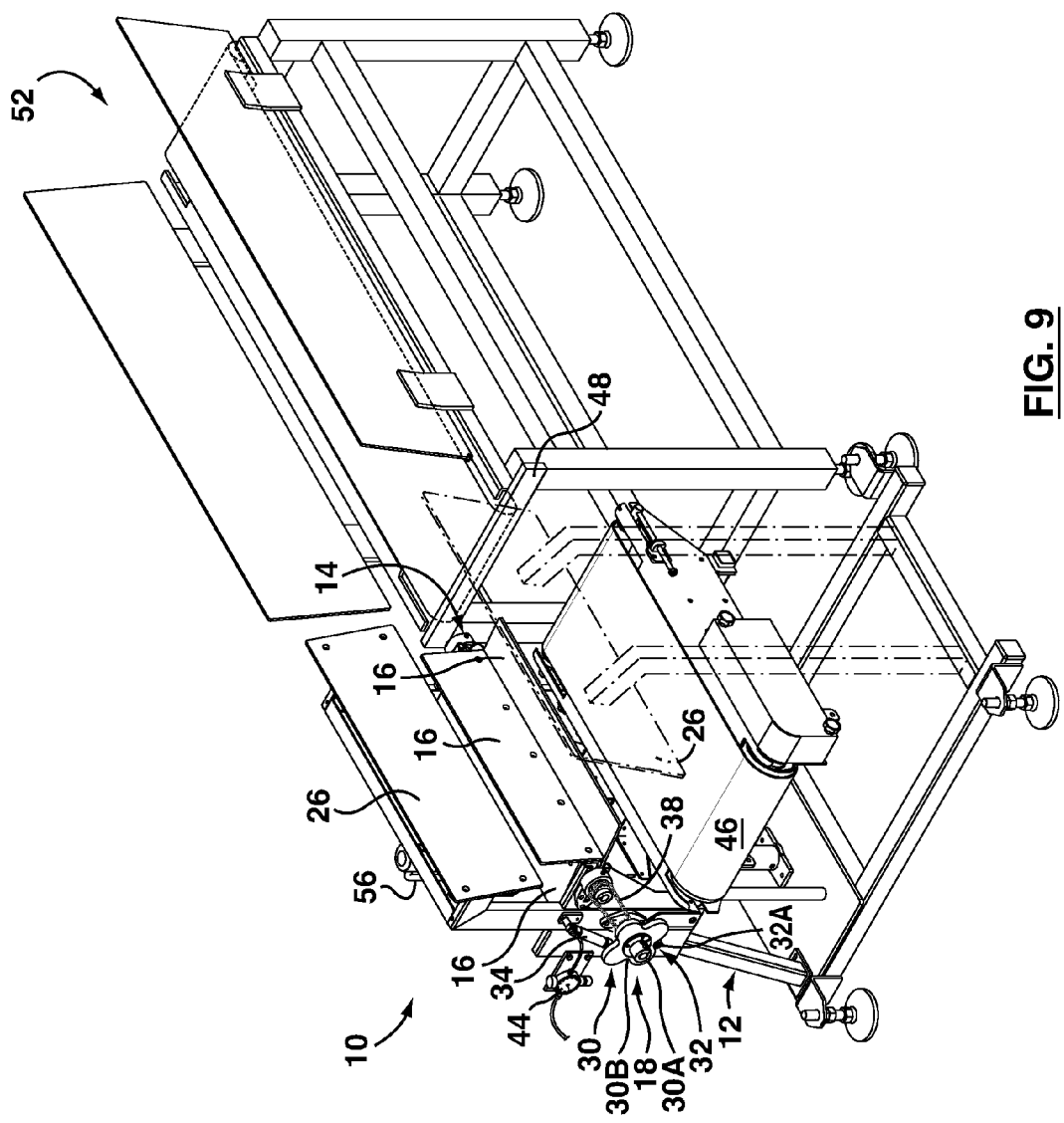
FIG. 9 is a perspective view of the bag turning machine of FIG. 1 together with the conveyor system of FIG. 8A.

A bag turning machine according to an aspect of the present invention can be positioned adjacent a bag filling and sealing machine, or a bag sealing machine, to receive filled and sealed bags directly therefrom, or may be positioned to receive filled and sealed bags from a conveyor system. For example, and without limitation, the exemplary bag turning machine 10 may be used in association with a Hamer® ice bagging machine, such as the Hamer Model 540 ice bagging machine, offered by Hamer, LLC, having an address at 14650 28$^{th}$ Ave. N., Plymouth, Minn. 55447 U.S.A. FIG. 9 shows the exemplary bag turning machine 10 arranged to receive bags from a conveyor system 52.

Operation of the exemplary bag turning machine 10 will now be described with reference to FIGS. 8A to 8E and FIGS. 10A to 10D.

Figure 8A:
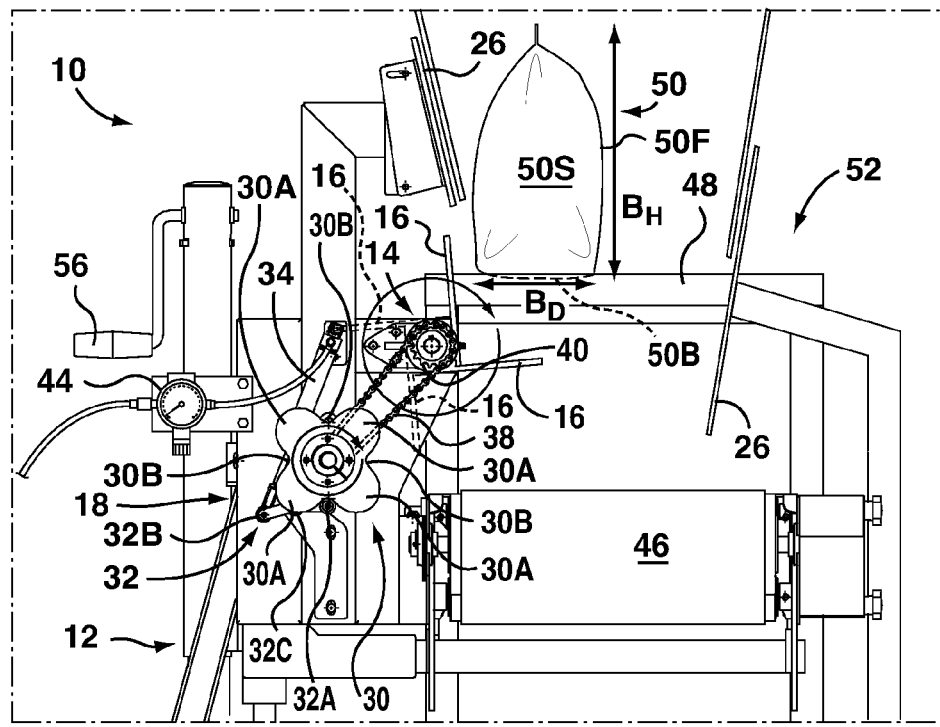
FIG. 8A is a front view of a portion of the bag turning machine of FIG. 1, showing a bag about to be received by the bag turning machine of FIG. 1 from a conveyor system.
Figure 8B:
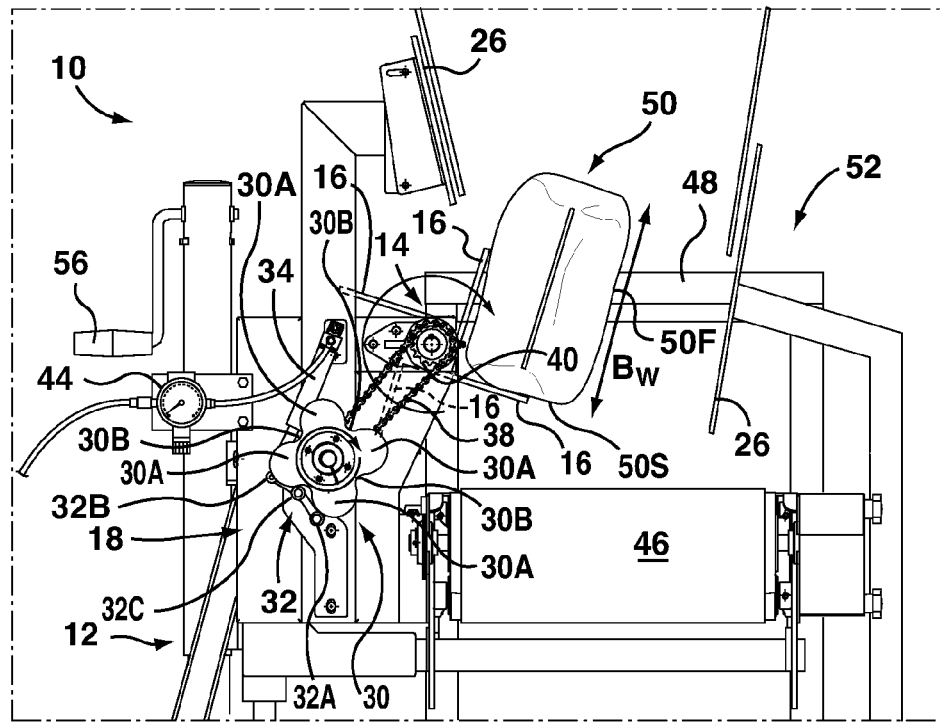
FIG. 8B is a front view of a portion of the bag turning machine of FIG. 1 and the conveyor system of FIG. 8A, showing a bag received by bag turning members thereof and the shaft thereof beginning to rotate.
Figure 10A:
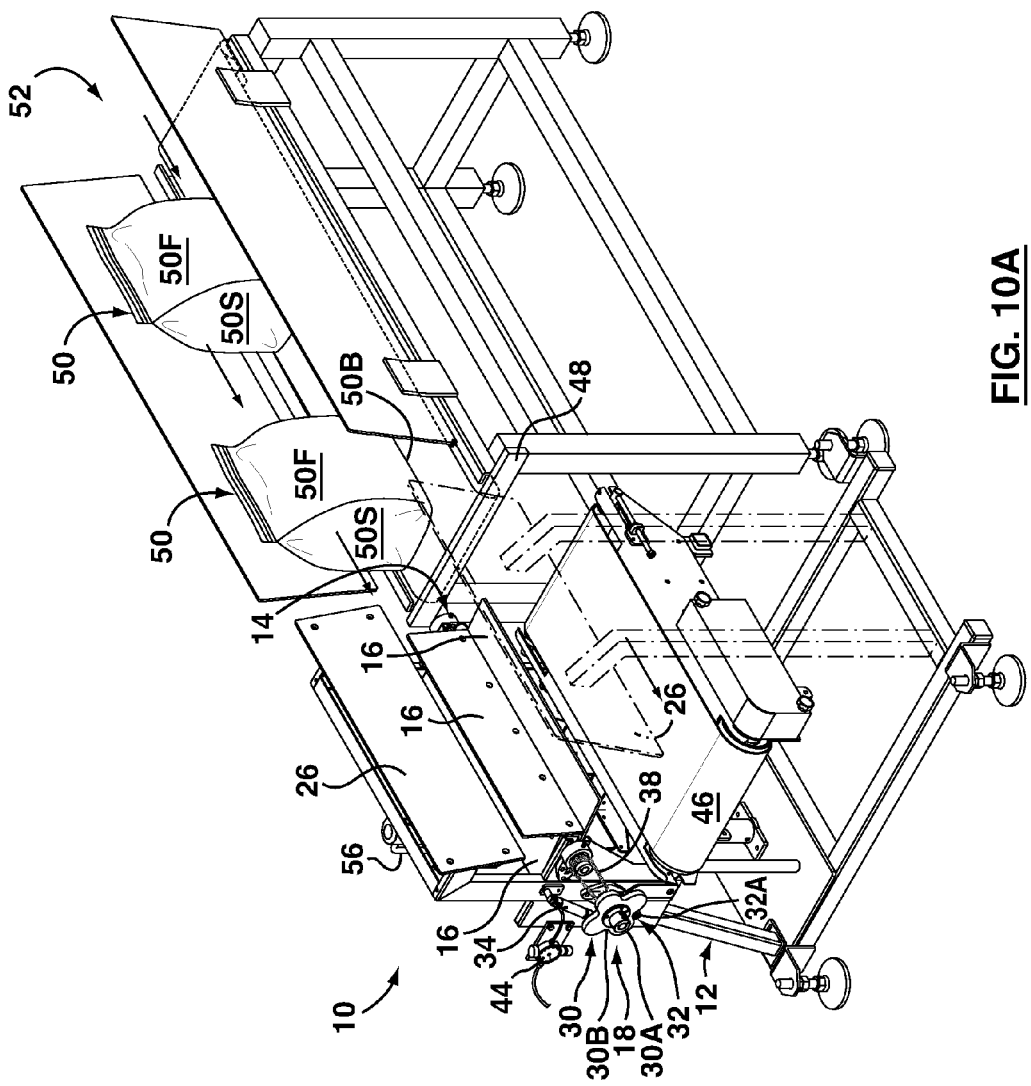
FIG. 10A is a perspective view of the bag turning machine of FIG. 1, showing a bag about to be received by the bag turning machine from the conveyor system of FIG. 8A.

FIGS. 8A and 10A show the exemplary bag turning machine 10 ready to receive filled and sealed bags 50, which are carried to the bag turning machine 10 by a conveyor system 52 from a bag filling machine (not shown). The bags 50 each have a height $B_H$ (FIG. 8A), a width $B_W$ (FIG. 8B) and a depth $B_D$ (FIG. 8A), with the width $B_W$ of the bag 50 being less than its height $B_H$ and the depth $B_D$ of the bag 50 being less than its width $B_W$. The filled and sealed bags 50 are received at the bag turning machine 10 in an upright position, each resting on its respective base 50B, with each bag 50 moving substantially parallel to the width of the bag 50. The shaft 14 is maintained in position for the plates 16 to receive a filled and sealed bag 50 by the force exerted by the pneumatic piston-cylinder assembly 34, which keeps the first end 32A of the cam follower 32 resting in one of the recesses 30B between the leaves 30A of the cam 30, thereby inhibiting the cam 30, and hence the shaft 14 and plates 16, from turning. More particularly, the pneumatic piston-cylinder assembly 34 urges the first end 32A of the cam follower 32 inwardly into one of the recesses 30B between the leaves 30A of the cam 30, providing an initial resistance to rotation.

Figure 10B:
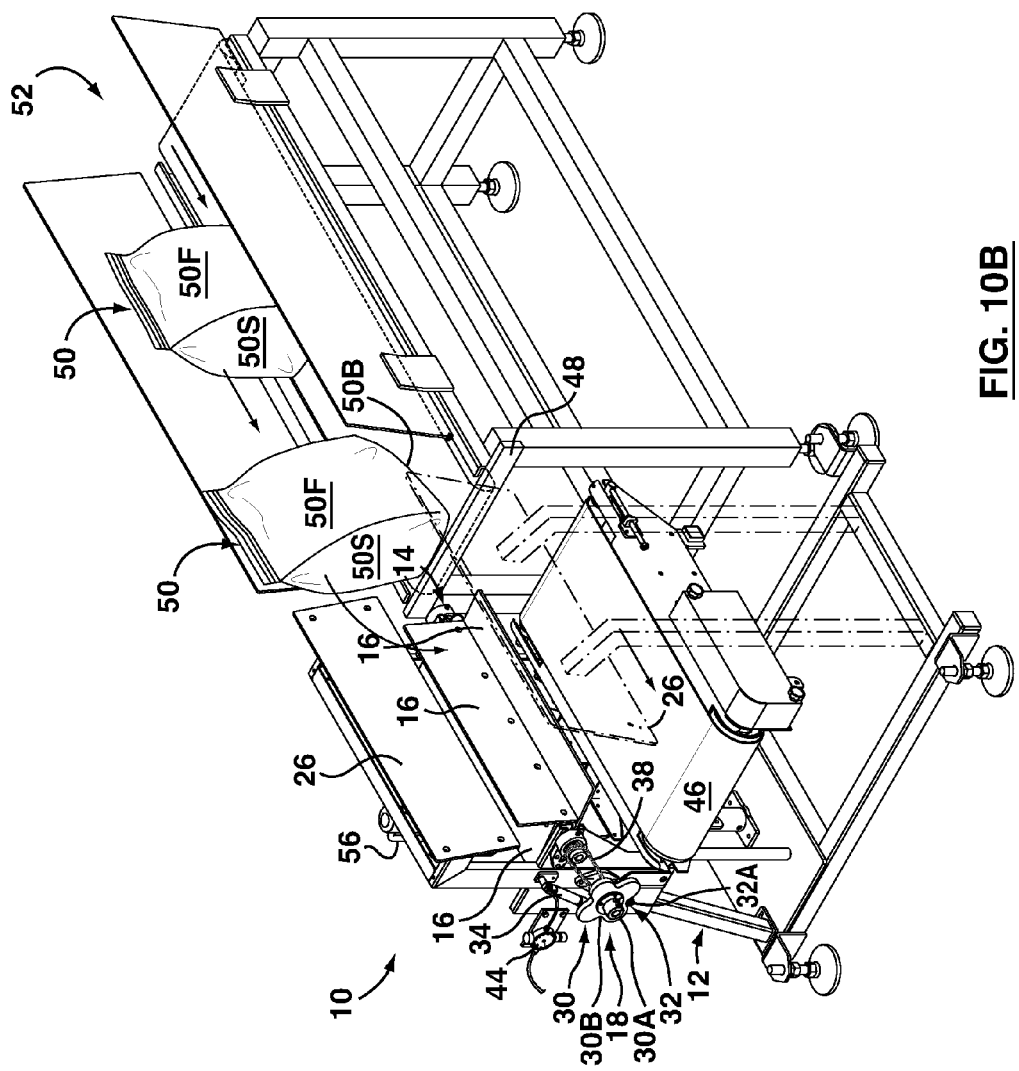
FIG. 10B is a perspective view of the bag turning machine of FIG. 1 and conveyor system of FIG. 8A, showing a bag being tipped from an upright position on the conveyor system of FIG. 8A.
Figure 10C:
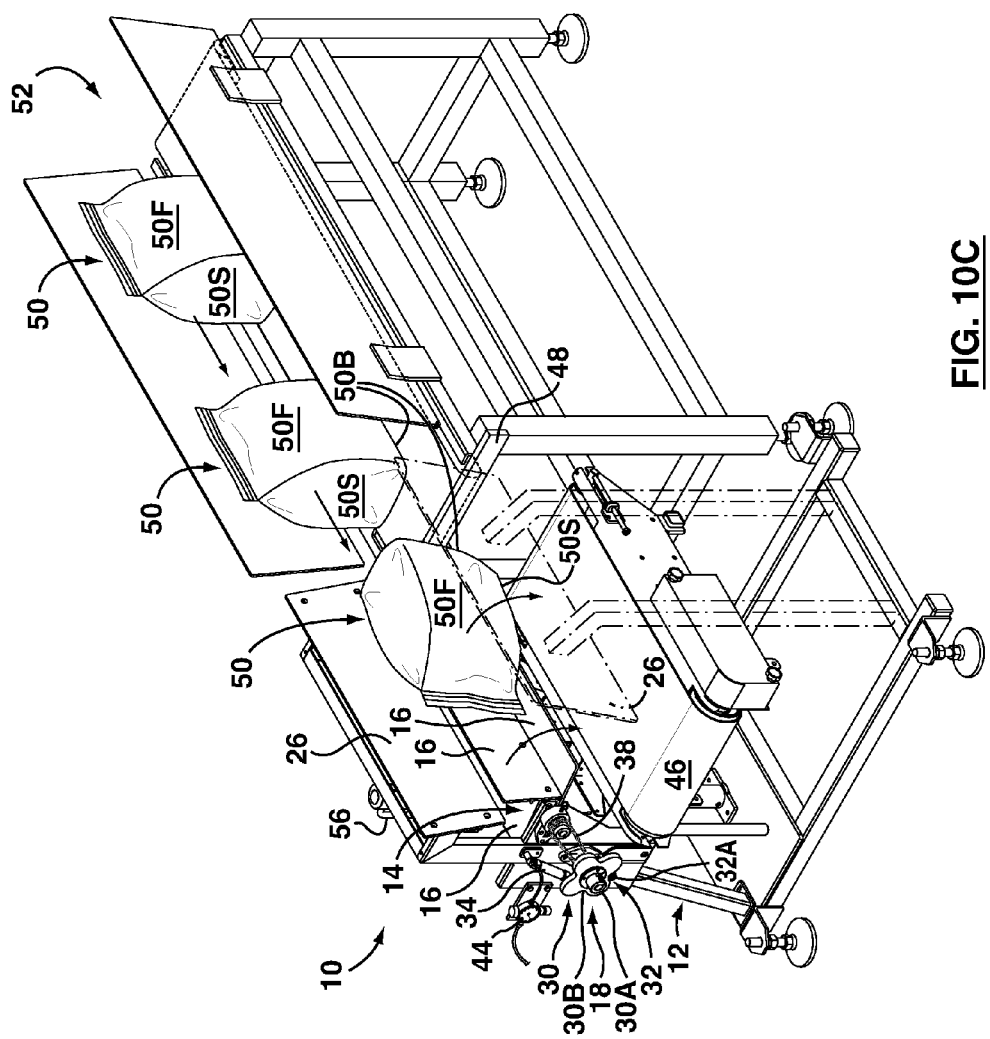
FIG. 10C is a perspective view of a portion of the bag turning machine of FIG. 1 and conveyor system of FIG. 8A, showing the bag falling onto the bag turning members of the bag turning machine.
Figure 10D:
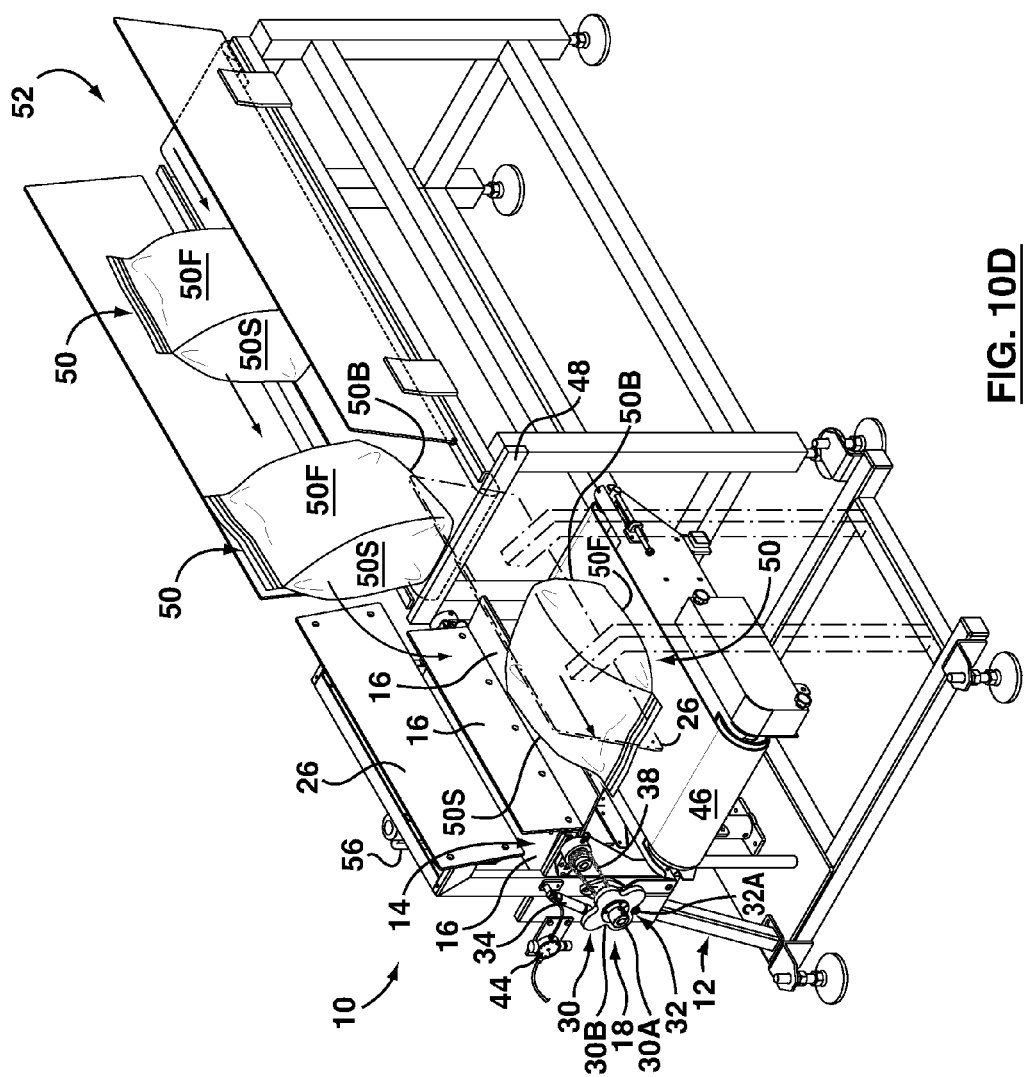
FIG. 10D is a perspective view of a portion of the bag turning machine of FIG. 1 and conveyor system of FIG. 8A, showing the bag resting on its face on a conveyor belt of the bag turning machine, with the shaft having rotated into position for the bag turning members to receive another bag.

As best seem in FIG. 10B, as the conveyor system 52 advances the filled and sealed bags 50 the lower side edge of the next bag 50 engages the tipping member 48, which in the embodiment shown in FIGS. 8A to 10D is carried by the conveyor system 52 feeding the bag turning machine 10. The bag 50 then tips over from its initial upright position, pivots downwardly and then falls onto the lowermost plate 16 of one of the pairs 16P of plates 16, with the bag 50 landing on its side edge 50S, as shown in FIGS. 8B and 10C.

Figure 8C:
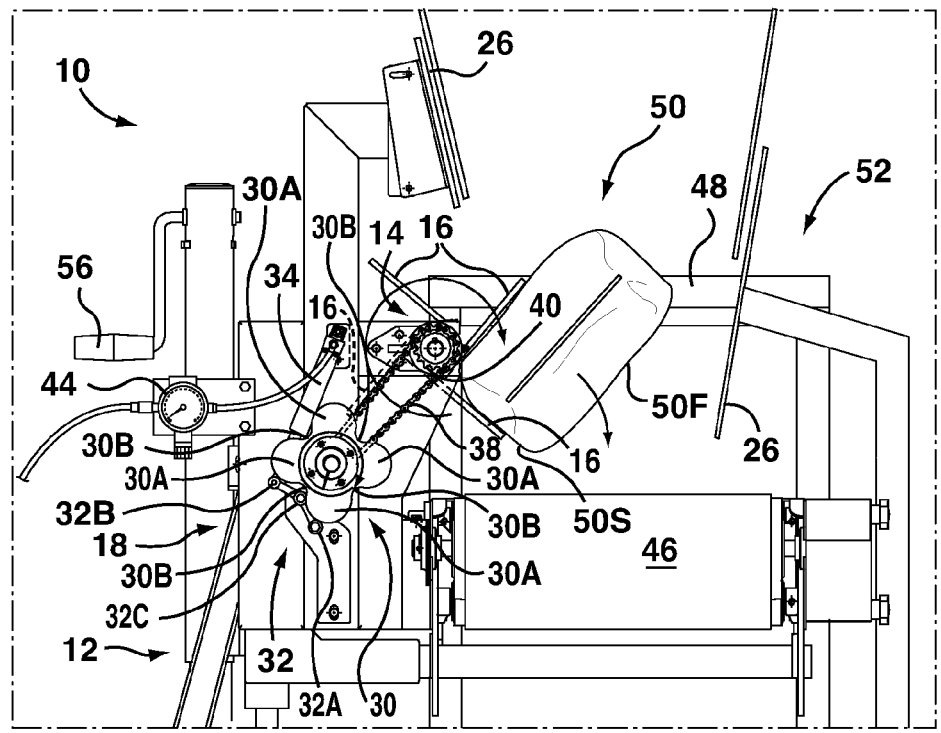
FIG. 8C is a front view of a portion of the bag turning machine of FIG. 1 and the conveyor system of FIG. 8A, showing the shaft and bag turning members thereof turning the bag to rest on the face of the bag.
Figure 8D:
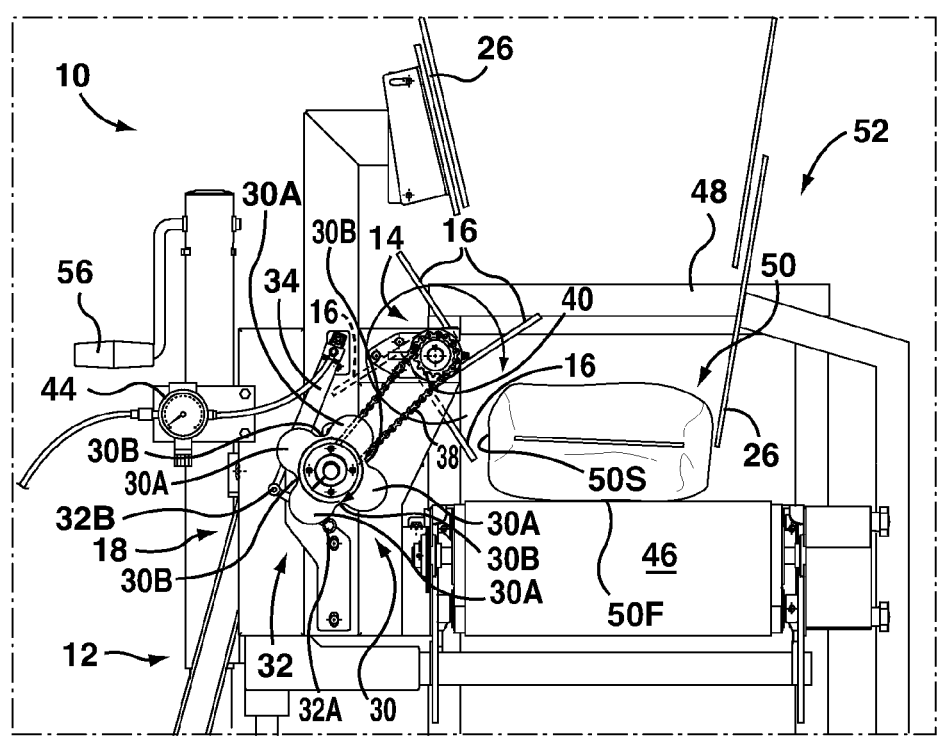
FIG. 8D is a front view of a portion of the bag turning machine of FIG. 1 and the conveyor system of FIG. 8A, showing the bag having been released by the bag turning members to rest on the face of the bag as the shaft continues to rotate.

When the bag 50 lands on the lowermost plate 16, the weight of the bag 50 against the lowermost plate 16 urges the shaft 14 to turn. The resistance of the biasing member 34, in particular the pressure of the piston-cylinder assembly 34, is calibrated to the weight of the filled and sealed bag 50 so that the weight of the bag 50 is sufficient to overcome the initial resistance to rotation. Specifically, through the chain 38 and sprockets 40, 42, rotation of the shaft 14 drives rotation of the cam 30, forcing the first end 32A of the cam follower 32 to move outwardly from the recess 30B along the surface of the adjacent leaf 30A, pivoting the second end 32B of the cam follower 32 toward the piston-cylinder assembly 34 and compressing the piston-cylinder assembly 34. As explained above, each leaf 30A serves as a resistance increasing portion of the cam 30A. As the cam 30 continues to turn, the shape of the leaf 30A forces the first end 32A of the cam follower 32 further outward along the first side of the leaf 32, pivoting the second end 32B of the cam follower 32 further toward the piston-cylinder assembly 34 and further compressing the piston-cylinder assembly 34 so as to increase the resistance offered by the piston-cylinder assembly 34. This increased resistance from the piston-cylinder assembly 34 is translated, through the chain 38 and sprockets 40, 42, into an increased resistance to rotation of the shaft 14, which slows the rotation of the shaft 14 and allows the bag 50 to be lowered and turned in a controlled manner rather than merely falling. More particularly, rotation of the shaft 14 under the weight of the bag 50, resisted by the piston-cylinder assembly 34, rotates the plates 16, which turn the bag 50 while lowering the bag 50 from the conveyor system 52 onto the conveyor belt 46 below, so that the bag 50 comes to rest on a face 50F of the bag 50, as shown in FIGS. 8C and 8D and in FIG. 10D. While weight of the bag 50 overcomes the resistance from the piston-cylinder assembly 34 and enables the shaft 14 to rotate, the magnitude of this resistance controls the speed at which the shaft 14 rotates and hence the speed at which the bag 50 is turned by the shaft 14 and plates 16. As noted above, the resistance provided by the piston-cylinder assembly 34 can be adjusted so that the bag turning machine 10 can accommodate filled and sealed bags 50 of various sizes and weights.

Figure 8E:
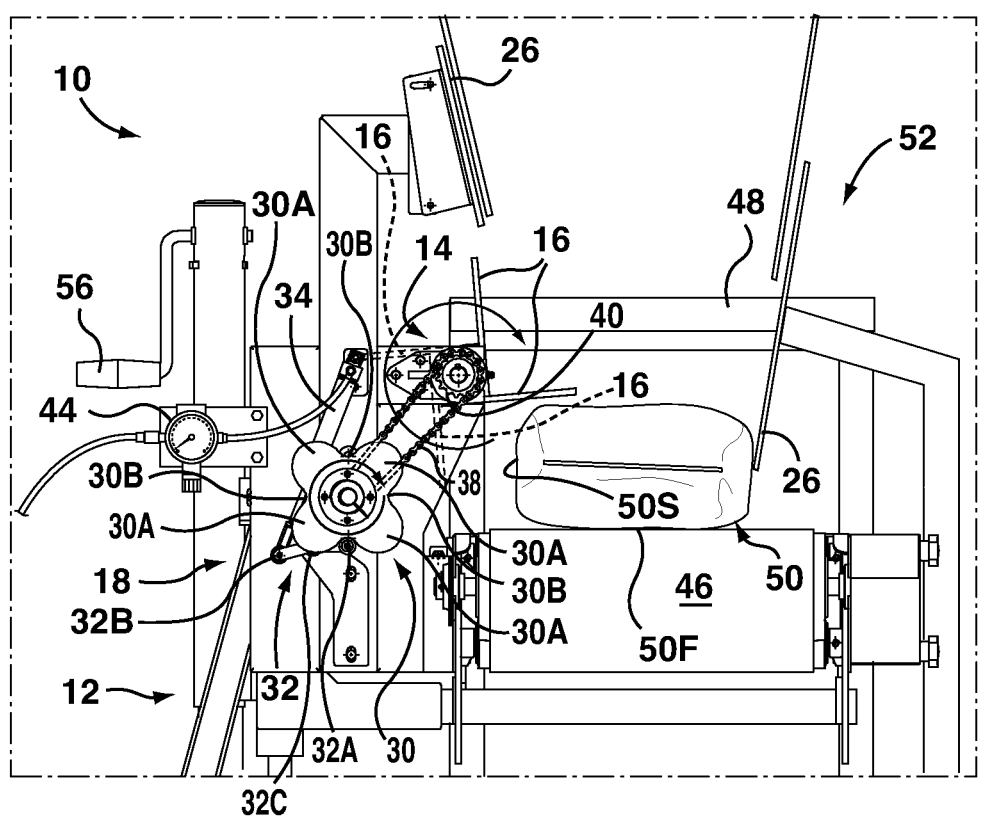
FIG. 8E is a front view of a portion of the bag turning machine of FIG. 1 and the conveyor system of FIG. 8A, showing the bag resting on its face with the shaft having rotated into position for the bag turning members to receive another bag.

When the filled and sealed bag 50 has been released by the plates 16, as shown in FIG. 8D, the first end 32A of the cam follower 32 will have rounded the crest of the leaf 30A of the cam 30, such that the first end 32A of the cam follower 32 rides along the second side of the leaf 30 under the inward urging from the piston-cylinder assembly 34, coming to rest in the next recess 30B between the leaves 30A of the cam 30, as shown in FIG. 8E. In this position, the shaft 14 is in position for the plates 16 to receive a filled and sealed bag 50, and is maintained in this position by the cam 30, cam follower 32 and piston-cylinder assembly 34, which again provide an initial resistance to rotation. As such, the bag turning machine 10 is ready to receive another bag 50.

FIG. 11 shows an alternate embodiment of a bag turning machine according to an aspect of the present invention, indicated generally by the reference numeral 1110. Elements in the alternate embodiment 1110 corresponding to those in the first embodiment 10 are denoted with identical reference numerals, except with the prefix "11". In the bag turning machine 1110 shown in FIG. 11, the cam 1130 is drivingly coupled to the shaft 1114 by being directly mounted on the shaft 1114, thereby omitting the need for a chain and sprockets, and a spring 1134A is used as the biasing member, omitting any piston-cylinder assembly and adjustable valve. The bag turning machine 1110 shown in FIG. 11 is otherwise identical to the first embodiment 10.

Figure 12:
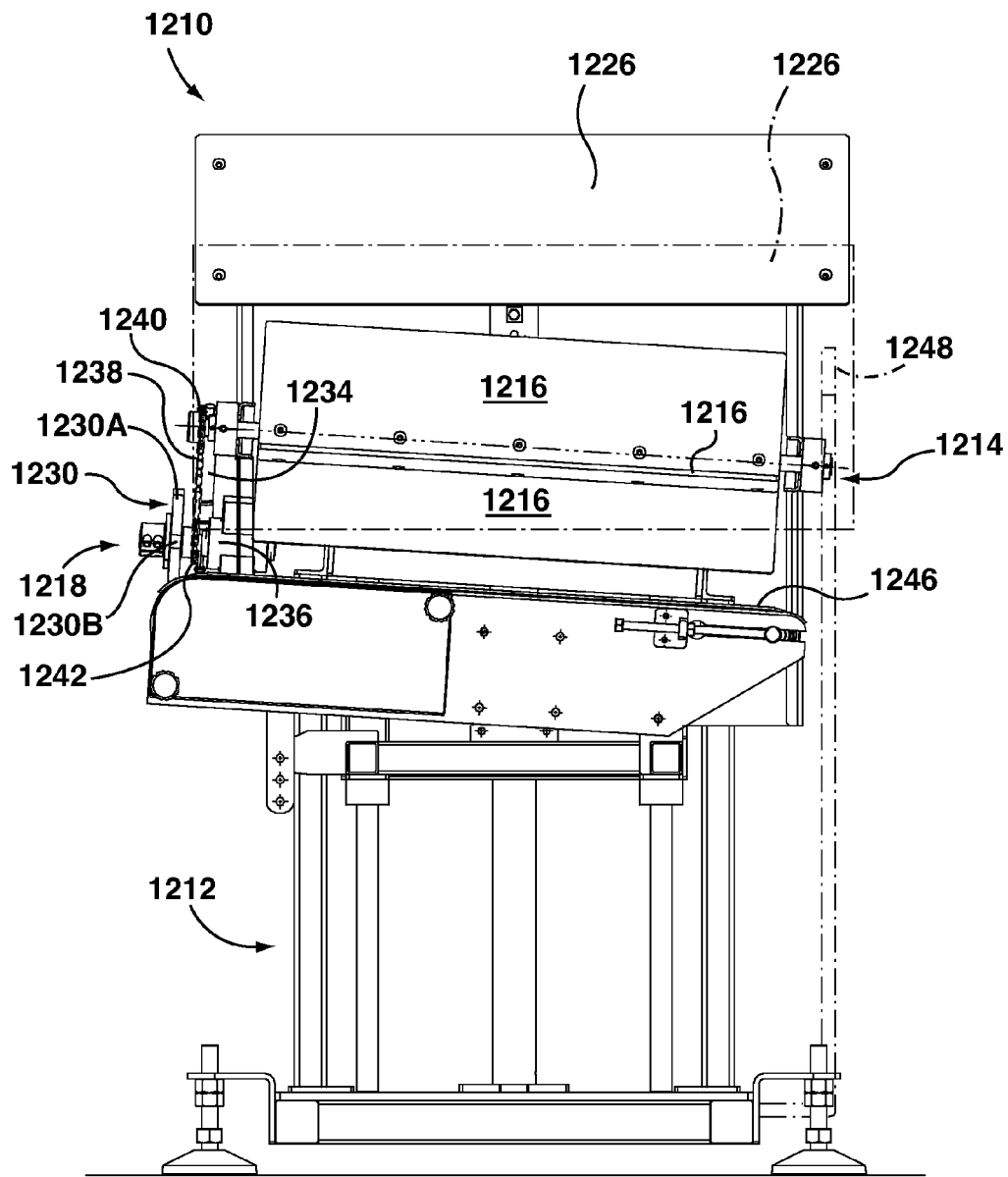
FIG. 12 is a side view of a third embodiment of a bag turning machine according to an aspect of the present invention.

In certain applications in which a bag turning machine according to an aspect of the present invention is used, filled and sealed bags may be received by the bag turning machine very shortly after having been heat sealed, and before the seal has had time to cool and is therefore weak. For these applications, a modified form of bag turning machine may be used, as shown in FIG. 12. In FIG. 12, an alternate embodiment of a bag turning machine according to an aspect of the present invention is shown generally at 1210, and identical reference numerals are used to refer to features corresponding to those in the first embodiment of a bag turning machine 10, except with the prefix "12". The alternate bag turning machine 12 is identical to the first embodiment of a bag turning machine 10, except that the shaft 1214 and the conveyor belt 1246 (or other transport surface) are each inclined upwardly relative to horizontal so that the bag turning members 1216 and the conveyor belt 1246 (or other transport surface) will each receive the filled and sealed bags such that the bottom of each filled and sealed bag is lower than the top thereof. This keeps the contents of the bags from sliding under gravity against the seals while the seals are still weak.

A plurality of currently preferred embodiments have been described by way of example. It will be apparent to persons skilled in the art that a number of variations and modifications can be made without departing from the scope of the invention as defined in the claims. Specific alternate embodiments, such as that the biasing member may be a spring rather than a piston-cylinder assembly, that the bag turning members may comprise spaced-apart fingers instead of plates, and that the shaft and transport surface may be upwardly inclined rather than horizontal, are merely examples of such variations and modifications and are not intended to limit the scope of such possible variations and modifications.

Thus, the above description is intended in an illustrative rather than a restrictive sense. Variations to the exact embodiments described may be apparent to those skilled in the relevant art without departing from the spirit and scope of the claims set out below. It is intended that any such variations be deemed within the scope of this patent.

What is claimed is:

1. A bag turning machine, comprising:
    a frame;
    a shaft rotatably carried by the frame;
    a plurality of bag turning members carried by the shaft for receiving a filled and sealed bag resting on its side edge and turning the filled and sealed bag onto its face; and
    a brake for resisting rotation of the shaft upon receipt by the bag turning members of the filled and sealed bag and for arresting rotation of the shaft, following release by the bag turning members of the filled and sealed bag, in a predetermined position for receipt by the bag turning members of another filled and sealed bag;
    wherein the brake comprises:
    a cam rotatably carried by the frame and drivingly coupled to the shaft so that resistance to rotation of the cam resists rotation of the shaft;
    a cam follower movably carried by the frame and arranged to follow an outer perimeter of the cam; and
    a biasing member acting between the frame and the cam follower to urge the cam follower inwardly against the outer perimeter of the cam;
    wherein the outer perimeter of the cam has alternating resistance increasing portions and arresting portions.

2. The bag turning machine of claim 1, wherein the cam is a cloverleaf cam whose leaves define the resistance increasing portions and whose recesses between the leaves define the arresting portions.

3. The bag turning machine of claim 2, wherein the biasing member is a pneumatic piston-cylinder assembly.

4. The bag turning machine of claim 2, wherein the biasing member is a spring.

5. The bag turning machine of claim 1, wherein the biasing member is adjustable to vary a biasing force exerted by the biasing member on the cam follower.

6. A bag turning machine, comprising:
a frame;
a shaft rotatably carried by the frame;
a plurality of bag turning members carried by the shaft for receiving a filled and sealed bag resting on its side edge and turning the filled and sealed bag onto its face; and
a brake for resisting rotation of the shaft upon receipt by the bag turning members of the filled and sealed bag and for arresting rotation of the shaft, following release by the bag turning members of the filled and sealed bag, in a predetermined position for receipt by the bag turning members of another filled and sealed bag;
a transport surface below and laterally offset from the shaft for receiving the filled and sealed bags from the bag turning members;
wherein the shaft is inclined upwardly relative to horizontal to receive the filled and sealed bags such that a bottom of each filled and sealed bag is lower than a sealed top thereof.

7. The bag turning machine of claim 6, wherein the transport surface is inclined upwardly relative to horizontal to receive the filled and sealed bags such that a bottom of each filled and sealed bag is lower than a sealed top thereof.

8. A bag turning machine, comprising:
a frame;
a shaft rotatably carried by the frame;
a plurality of bag turning members carried by the shaft for receiving a filled and sealed bag resting on its side edge and turning the filled and sealed bag onto its face; and
a brake for resisting rotation of the shaft upon receipt by the bag turning members of the filled and sealed bag and for arresting rotation of the shaft, following release by the bag turning members of the filled and sealed bag, in a predetermined position for receipt by the bag turning members of another filled and sealed bag;
wherein:
  the bag turning members comprise sets of paired projections arranged in a substantially L-shaped configuration and extending perpendicularly from an axis of rotation of the shaft;
  the sets of paired projections comprise plates extending along the shaft; and
  the shaft comprises a square tube and the plates extend from each face of the tube so that each set of paired projections is a pair of plates extending from adjacent faces of the tube and each pair of plates shares a common plate with each adjacent pair of plates.

9. A bag turning machine, comprising:
a frame;
a shaft rotatably carried by the frame;
a plurality of generally L-shaped sets of bag turning members extending from the shaft perpendicularly to an axis of rotation of the shaft and spaced about a perimeter of the shaft;
a cloverleaf cam rotatably carried by the frame and drivingly coupled to the shaft so that resistance to rotation of the cam resists rotation of the shaft;
the cam having a number of leaves equal to a number of sets of bag turning members extending from the shaft;
a cam follower movably carried by the frame and arranged to follow an outer perimeter of the cam; and
a biasing member acting between the frame and the cam to urge the cam follower inwardly against the outer perimeter of the cam;
whereby:
resistance from the biasing member applied to the shaft through the cam follower and the cam maintains a given set of bag turning members in a predetermined orientation to receive a filled and sealed bag;
a filled and sealed bag tipped over from an upright position and received by one of the sets of bag turning members with the bag resting on a side edge thereof rotates the shaft against and overcomes resistance from the biasing member so that the bag is lowered and turned by the bag turning members to rest on a face of the bag; and
the resistance from the biasing member controls a speed at which the bag is turned and lowered.

10. The bag turning machine of claim 9, wherein the biasing member is adjustable to vary the resistance therefrom.

11. The bag turning machine of claim 10, wherein the biasing member is a pneumatic piston-cylinder assembly.

12. A machine-implemented method of turning a bag, comprising:
receiving a filled and sealed bag in an upright position, the bag having a width less than its height and a depth less than its width;
the bag moving substantially parallel to its width;
tipping the bag over onto bag turning members of a bag turning machine so that the bag lands on a side edge thereof; and
rotating the bag turning members to turn the bag to rest on a face of the bag while lowering the bag from a first height to a second height.

* * * * *